United States Patent
Basson et al.

(10) Patent No.: US 6,922,726 B2
(45) Date of Patent: Jul. 26, 2005

(54) WEB ACCESSIBILITY SERVICE APPARATUS AND METHOD

(75) Inventors: Sara H. Basson, White Plains, NY (US); Dimitri Kanevsky, Ossining, NY (US); Thiruvilwamalai V. Raman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 09/816,899

(22) Filed: Mar. 23, 2001

(65) Prior Publication Data

US 2002/0138616 A1 Sep. 26, 2002

(51) Int. Cl.[7] .............................................. G06F 15/16
(52) U.S. Cl. ...................... 709/227; 709/203; 709/205; 709/225; 709/229; 709/232
(58) Field of Search ................................ 709/227, 228, 709/236, 229, 203, 205, 232, 217, 218, 225, 246; 705/2, 3, 39; 704/274

(56) References Cited

U.S. PATENT DOCUMENTS

| | | | | |
|---|---|---|---|---|
| 6,035,281 A | * | 3/2000 | Crosskey et al. | 705/14 |
| 6,167,378 A | * | 12/2000 | Webber, Jr. | 705/7 |
| 6,256,613 B1 | * | 7/2001 | Falchuk et al. | 705/2 |
| 6,412,008 B1 | * | 6/2002 | Fields et al. | 709/228 |
| 6,421,733 B1 | * | 7/2002 | Tso et al. | 709/217 |
| 6,457,030 B1 | * | 9/2002 | Adams et al. | 715/513 |
| 6,609,113 B1 | * | 8/2003 | O'Leary et al. | 705/40 |
| 6,662,163 B1 | * | 12/2003 | Albayrak et al. | 704/275 |
| 6,665,642 B2 | * | 12/2003 | Kanevsky et al. | 704/260 |
| 6,714,963 B1 | * | 3/2004 | Levine et al. | 709/203 |
| 6,738,803 B1 | * | 5/2004 | Dodrill et al. | 709/218 |
| 6,810,410 B1 | * | 10/2004 | Durham | 709/203 |

OTHER PUBLICATIONS

Paciello, M G, Access to electronic information by people with disabilities, Feb 1997, Compcon '97 Proceedings, IEEE, pp. 235–239.*

* cited by examiner

Primary Examiner—Ario Etienne
Assistant Examiner—Ramy M Osman
(74) Attorney, Agent, or Firm—Duke W. Yee; Betty Formby

(57) ABSTRACT

A web accessibility service apparatus and method is provided. The web accessibility service apparatus and method provides accessibility tools to disabled users on a per-use basis. The provider of the accessibility tool is paid for each use of the accessibility tool to access content on the data network. The revenue may be obtained from content suppliers as consideration to the accessibility tool provider for providing another customer that otherwise may not have had access to their content. In this way, the accessibility tool is provided to the user at no cost, yet the provider of the accessibility tool is compensated for each use of their accessibility tool.

28 Claims, 5 Drawing Sheets

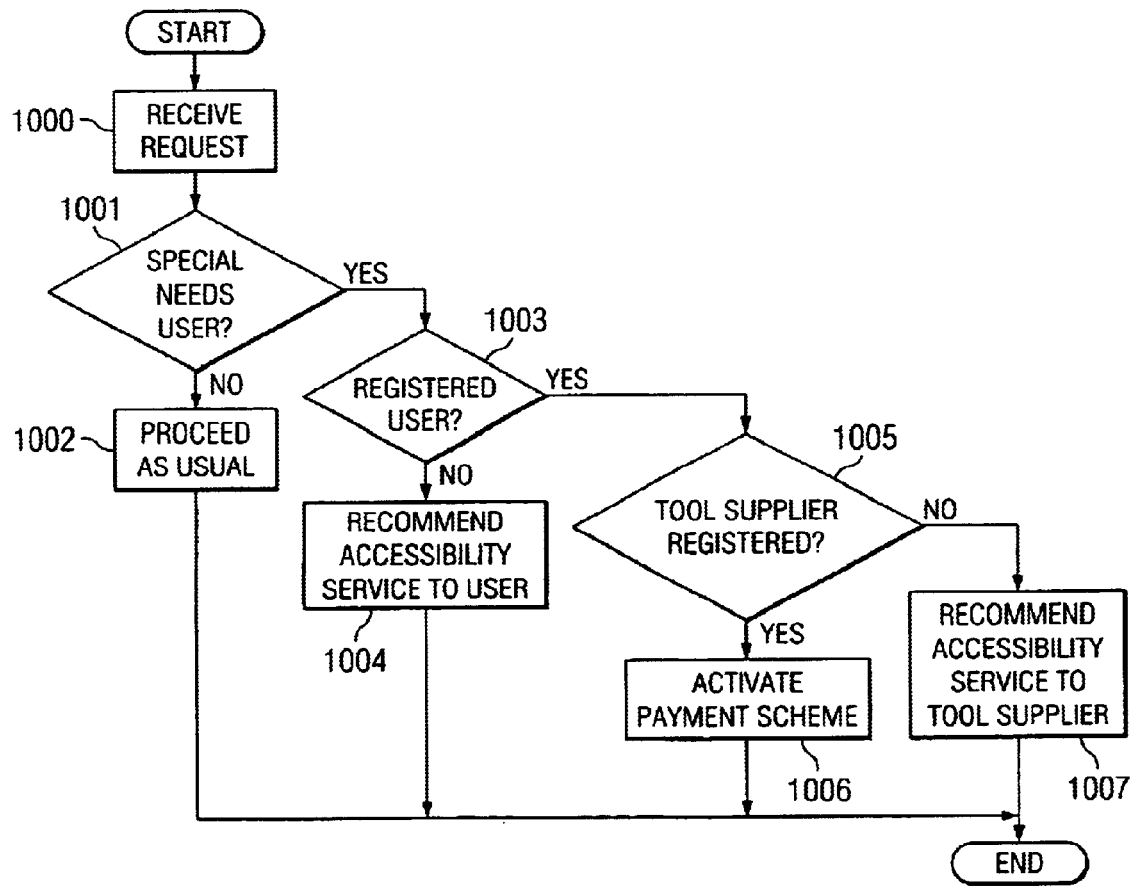

WEB ACCESSIBILITY SERVICE APPARATUS AND METHOD

BACKGROUND OF THE INVENTION

1. Technical Field:

The present invention is directed to an improved data processing system. More specifically, the present invention is directed to an apparatus and method for providing web accessibility services.

2. Description of Related Art:

As the ADA becomes widely applied to Internet Web sites and other online properties, accessibility to these Internet Web sites, by persons having a different set of abilities becomes mandated by law. Online service providers and electronic businesses (e-businesses) need help in meeting these requirements and ensuring that they serve all their customers. As Web sites begin to differentiate themselves based on service, online businesses that offer service tailored to the customer's needs are more likely to be favored by customers with disabilities, or customers with a different set of abilities, than those Web sites that do not offer such tailored service. Until now, the industry has focused on designing shrink-wrapped client-side accessibility solutions ranging from screen-readers to self-voicing Web browsers like IBM Home Page Reader™ (HPR). IBM Home Page Reader™ is an IBM product that turns Internet Explorer into a talking browser.

Selling shrink-wrapped solutions like HPR into the support-intensive accessibility market at an affordable price is a difficult proposition. Products like IBM's Via Voice™, which uses speech recognition to type documents, for example, may be very helpful to people that cannot move or are otherwise unable to use a keyboard. Because Via Voice™ is relatively cheap, and the market of persons having special needs is relatively small when compared to the overall market, selling the Via Voice™ application to mobile-impaired users as a client end product is not a profitable venture. For this reason, companies that sell speech recognition products are not given an incentive to market their products to a relatively small market of mobile-impaired users.

Thus, it would be beneficial to have an apparatus and method for providing accessibility products to persons having special needs that is both relatively cheap for the end user as well as profitable for the supplier of the accessibility product.

SUMMARY OF THE INVENTION

Today's mainstream Internet, such as the World Wide Web, is characterized by the user agents being free, with revenue being made primarily on the server-side. This business model can be applied to providing Web accessibility to persons with special needs as a service. The present invention makes use of this model to provide a Web accessibility apparatus and method to users having special needs.

The accessibility service provider provides expertise on accessible information design along with technology offerings like speech tools. However, instead of selling this expertise, information and technology as a packaged one-time, one-size fits all solution, the present invention provides an accessibility service based on a per-access revenue model.

With such a per-access revenue model, a services provider may offer accessibility as a service to major content providers. As an example, major airlines may use the present invention to contract with an accessibility service provider to provide an access friendly view of their Web site. Under such a contract, the accessibility service provider may be paid, for example, based on the number of hits received by the accessibility service provider. For example, a company may supply speech recognition to mobile-impaired users through an accessibility services provider such that profit is generated not through the purchase of the speech recognition product, but rather when the product is used, through the accessibility services provider, to browse the Internet.

Payment may be received not just through the Internet. A mobile-impaired user may order a movie on the television, or browse through different channels through the use of speech recognition technology and voice commands. In these cases, a television or cable company may contract with the accessibility services provider to pay the accessibility service provider for the use of a service that adds customers that otherwise may not use the product sold by the television or cable company.

In another example, a hearing impaired person may use an accessibility service provider that consists of speech recognition or a human operator, to call a store and order goods. In such a case the store or company may pay the service provider that allowed the transaction to exist.

In view of the above, the present invention provides an accessibility service apparatus and method for providing an accessibility service to users so that these users may gain access to content on a data network, such as the Internet. The apparatus and method provide a mechanism by which a user may request content from the data network from a content provider. The request for content may then be intercepted by an intelligent agent on the user's client device, a proxy server, or the like, which redirects the request to a mirror content provider. The mirror content provider provides the same content as the original content provider however, it is formatted for use with one or more accessibility tools.

The requested content is then transmitted from the mirror web site to the intelligent agent, or proxy server, where the content is then input to an accessibility tool. The accessibility tool performs various functions, depending on the type of accessibility tool, to generate a modified content output that is tailored to the specific needs of the user. For example, the accessibility tool may be a screen reader tool that reads the text presented on the client device display so that a visually impaired user may be informed of content being displayed.

The present invention further includes mechanisms by which the provider of the accessibility tool is compensated for the user of the accessibility tool. In a preferred embodiment, a fixed fee, or a portion of the revenue generated by a user using the accessibility tool is reapportioned to the provider of the accessibility tool. For example, if a user makes use of an accessibility tool to select a banner ad on a web page, the web site providing the banner ad is paid a fee from the owner of the banner ad and a portion of that fee may be redirected to the provider of the accessibility tool. The transfer of such funds may be performed in any known manner, such as by electronic fund transfer, mail, or the like. Other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 is an exemplary diagram for illustrating how a contractor may use the agreement between the service provider and the supplier that provides access to services according to a payment scheme; and FIG. 10 is a flowchart outlining an exemplary operation of the present invention.

DETAILED DESCRIPTION OF THE PREFERRED EMBODIMENT

Figure 1:
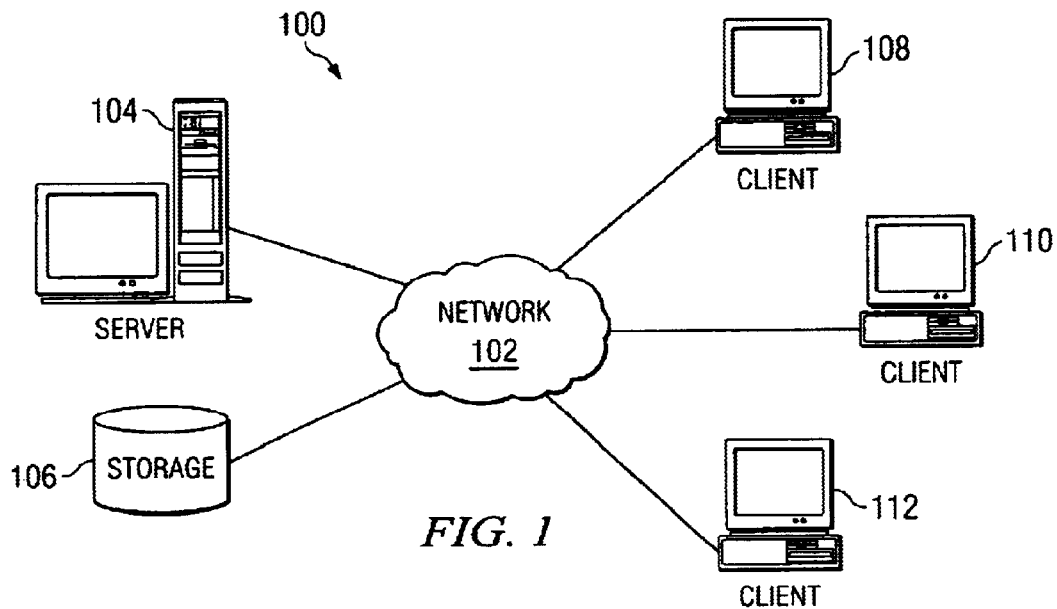
FIG. 1 is an exemplary block diagram of a network data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 maybe, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
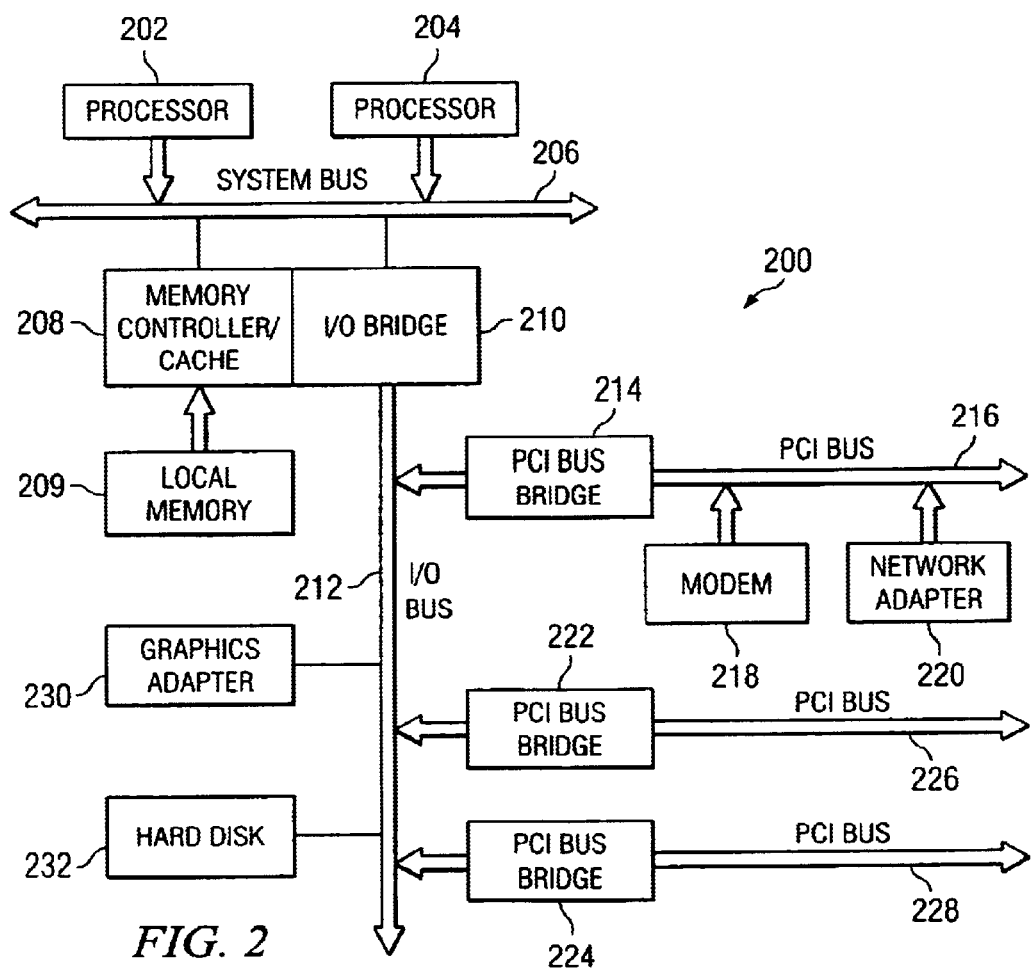
FIG. 2 is an exemplary block diagram of a server in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
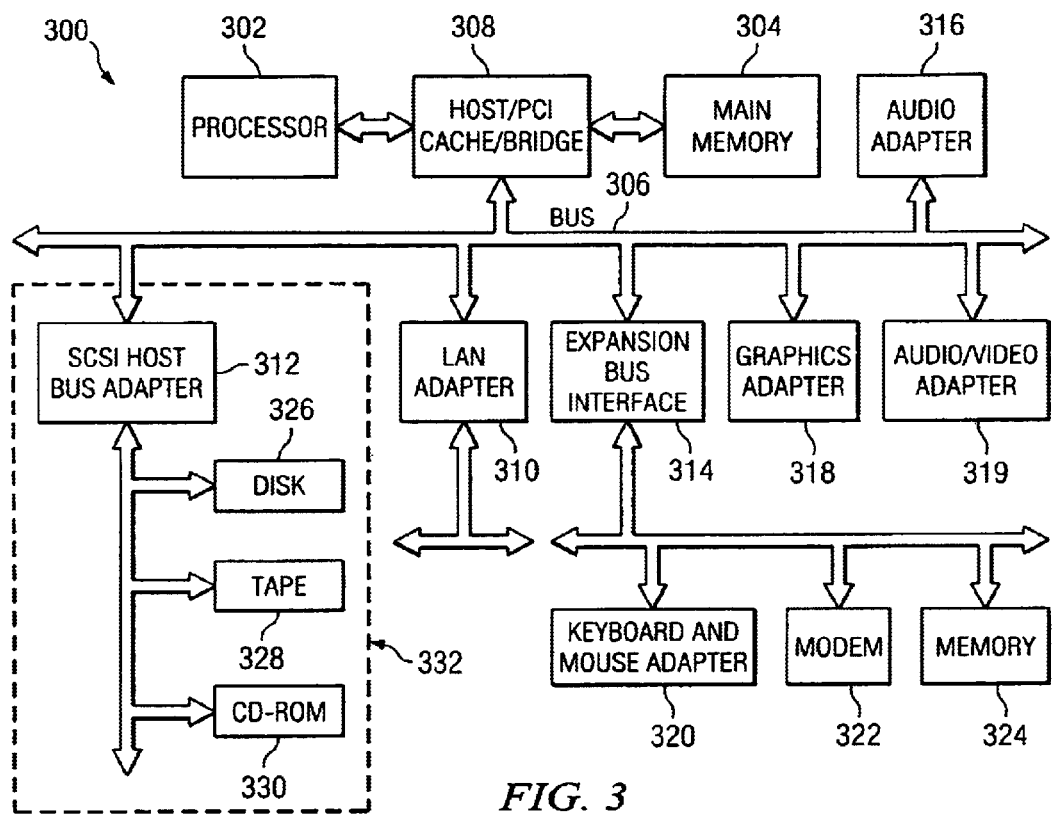
FIG. 3 is an exemplary block diagram of a client device in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCD local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection.

In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

With the present invention, a user of a client device, such as client device 300, may obtain accessibility tools to aid the user of the client device to access content on the data network. The user of the client device may, for example, enter an address for a web page that is of interest to the user in a web page request through a web browser application of the client device. The address may be intercepted by an applet on the client device, or a proxy server, along with an identifier indicating the type of accessibility tool that the user requires. The accessibility tool identifier may be incorporated in a data packet header of the data transmission of the web page address to the applet or proxy server.

The applet/proxy server receives the web page address from the client device and identifies an accessibility tool to be provided to the client device to aid the user in obtaining the content from the requested web page. The identification may be based on the accessibility tool identifier and information stored in an accessibility tool database, as described in more detail hereafter.

The accessibility tool is then provided to the client device for use with the client device's session with the requested web page. The accessibility tool may be provided, for example, by redirecting the web page request to a mirror web site. The mirror web page is a web page that provides the same content as the requested web page but is configured for use with one or more accessibility tools. The web page from the mirror web site may be transmitted to the proxy server/applet which then applies the required accessibility tool to the web page before providing the content of the web page to the user via the client device.

Once the session with the web site is concluded, the applet/proxy server may determine an amount of funds to be paid to the supplier of the accessibility tool based on the types of transactions performed by the user using the accessibility tool. For example, if a user used the accessibility tool to select a banner ad on the web page, and the web page provider is paid 1 cent for each selection of the banner ad from their web page, a portion of the 1 cent may be paid to the accessibility tool provider as consideration for providing an additional user that otherwise may not have had access to the web page or the banner ad. In this way, the supplier of the accessibility tool is able to provide an accessibility tool to a user at no cost to the user while still be compensated for the use of their accessibility tool by those who benefit from the user's use of the accessibility tool.

Figure 4:
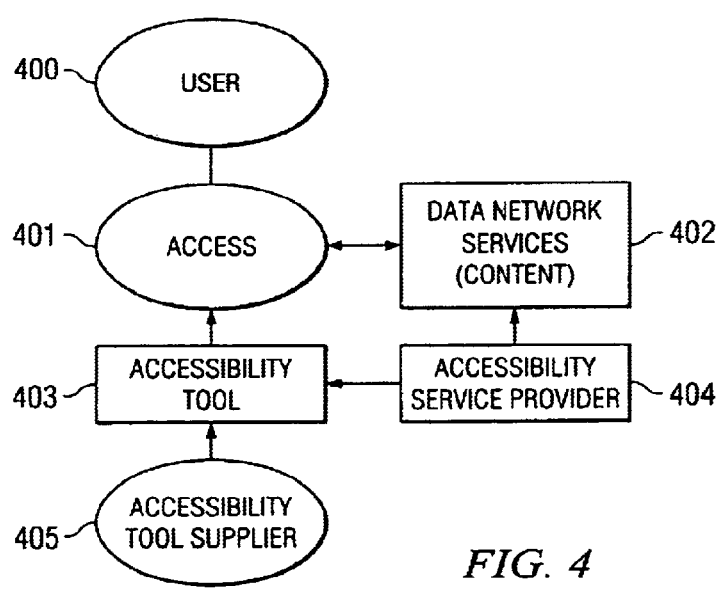
FIG. 4 is an exemplary block diagram illustrating a methodology of the present invention.

FIG. 4 is an exemplary block illustrating an exemplary methodology of the present invention. As shown in FIG. 4, a user 400 with special needs, or a different set of abilities, requires assistance in working with the data network. This may be a paralyzed, visually impaired, hearing impaired person, or the like. The user 400 may also have learning disabilities that prevent the user from reading, writing, or typing well. Module 401 represents that the user 400 requires access to an accessibility service. For example, a visually impaired person may require an accessibility service to aid the visually impaired person with reading content displayed on a computer screen. Such an accessibility service may be required for the disabled person to gain access to content on the data network, e.g., the Internet, and to interact with content providers to make purchases.

For a hearing impaired person, for example, this access 401 may be calling a store. For a paralyzed person this access 401 may symbolize the ability to turn on a computer, access the Internet, and make purchases online. For a person with dyslexia the access 401 may symbolize the ability to read a product description on the Internet that will assist with making a purchase. Module 402 represents the accessibility services that a person with disabilities may require. These services may include access to the Internet, shopping at a store, access to a device, such as a television, a computer, a car, or the like. An accessibility tool 403 gives a user access to services, information or to a particular device. The accessibility tool 403 is the device or service that is designed for use by disabled persons to aid them in working with content providers on the data network. Such accessibility tools are used to compensate for the fact that the user has a different set of abilities from that of the majority of users.

The accessibility tool 403 may be implemented in hardware, software, or a combination of hardware and software. The accessibility tool may be, for example, a plug-in device to a web browser application on a user's computer, an applet downloaded to the user's computer, a tool accessible to the user via a server, or the like.

The accessibility service provider 404 has many functions as described in greater detail hereafter. In short the accessibility service provider 404 provides a interface through which a user may obtain the assistance of an accessibility tool 403. In addition, the accessibility service provider 404 monitors how a user utilizes the accessibility tool 403 in order to obtain information related to revenue generated by the user of the accessibility tool 403. The accessibility service provider 404 further determines who provided the accessibility tool 403 that allowed the person to access the content, i.e. services, information, or devices, on the data network.

The accessibility tool 403 and the accessibility service provider 404 may be provided by the same server in the data network or by separate servers. Furthermore, the accessibility tool 403 may be provided in a user's computer while the accessibility service provider 404 is provided in a server of the data network. The only limitation to the configuration of the present invention is that the accessibility tool 403 and the accessibility service provider 404 must be able to communicate information to one another.

Examples of the accessibility tool 403 include automatic speech recognition, a screen reader, Accessible WebCite™, an intelligent agent, and the like, that allow for different types of accessibility on a user's client device, e.g. personal computer. Several examples of accessibility tools are given in U.S. Pat. No. 6,665,642 B2 entitled "Transcoding System and Method for Improved Access by Users with Special Needs," issued on Dec. 16, 2003, which is hereby incorporated by reference.

The accessibility service provider 404 has the ability to determine the supplier of the accessibility tool 403. Module 405 represents the companies and websites that supply the accessibility tools. The accessibility service provider 404 monitors which tools were used by the user and produces a payment scheme for the supplier of that particular accessibility tool for the service rendered. The payment scheme may be based on contractually agreed to terms between the accessibility tool supplier and the accessibility service provider 404, for example.

Figure 5:
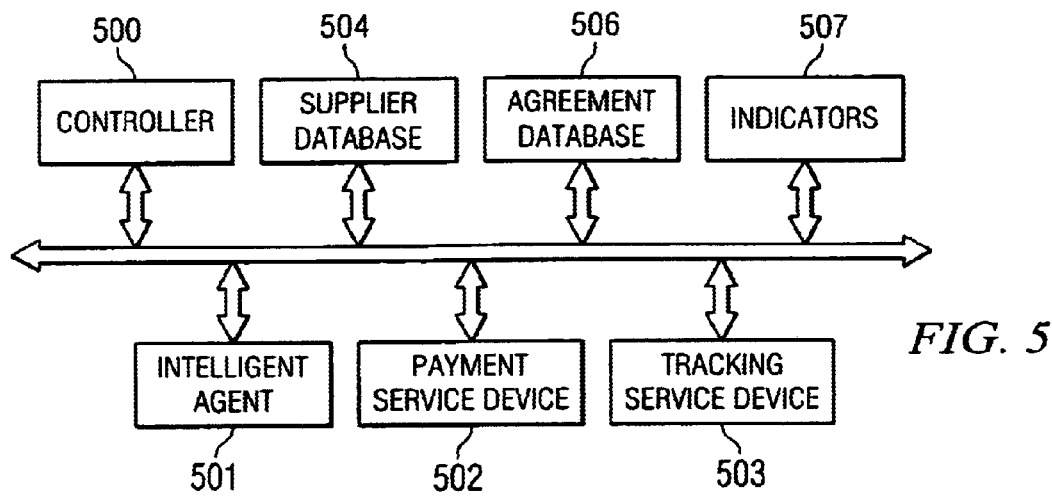
FIG. 5 is an exemplary block diagram of the accessibility service.

FIG. 5 is an exemplary block diagram illustrating an accessibility service provider, such as accessibility service provider 404 in FIG. 4, according to the present invention. The accessibility service provider according to a preferred embodiment of the present invention is implemented in a server of a data network. The accessibility service provider includes a controller 500 that controls the various functions of the accessibility service provider. The controller 500 is coupled to a tracking service device 503 that has access to a supplier database 504 storing information pertaining to the suppliers of accessibility tools. The tracking service device 503 also has access to an accessibility tools database 505 that stores information pertaining to the available accessibility tools.

The controller 500 is also coupled to an agreement database 506 that stores information pertaining to all of the organizations that have made an agreement with the controller 500 that they will receive payment for providing particular access services on a per-use basis. For example, the company that makes a speech recognition system may have a contract with the controller 500 that if the speech recognition system is used by persons with disabilities for a particular transaction over the data network, e.g., accessing a banner ad of a web page, then the company will receive a certain percent of the proceeds of the transaction for use of the speech recognition service.

The controller 500 further has access to indicators of the services/tools/providers 507 that the user accesses through use of the accessibility service provider. The indicators 507 identify the character of a certain access by the user. For example, the indicators 507 may include indicators identifying that the access was provided to a person with disabilities, that the person made use of a particular accessibility tool to access content, the providers of the content accessed, and the like.

The controller 500 is further coupled to a payment service device 502. The payment service device 502 makes payment to the supplier of the accessibility tool on the basis of the accessibility tool being used by a disabled user to access content. For example, after checking the indicator 507 that an accessibility tool was used, the controller 500 checks the agreement database 506 to determine whether the accessibility tool was provided according to an agreement. If so, then the controller 500 makes a payment to the supplier of the accessibility tool according to the agreement in the agreement database. Such payment may be performed in any known manner. In a preferred embodiment, such payment is performed by electronic transfer of funds to an account associated with the accessibility tool supplier.

The controller 500 also has access to the contractor of services device 508 that finds services and accessibility tools that are not yet covered by the accessibility tools database 505 but that provide accessibility tools that are beneficial to those with disabilities. The contractor device 508 attempts to entice the supplier or supplier of the accessibility tool with a general payment scheme that would apply to the given accessibility tool.

The controller 500 is further coupled to an intelligent agent system 501 that is composed of various intelligent agent software. One of the functions of the intelligent agent system 501 is to ensure that access to services was done with the help of services and accessibility tools that assist those with disabilities. The intelligent agent system 501 may find the manufacturers of the products that assist the people with disabilities through the tracking service device 503. The intelligent agent system 501 may then store one or more of the indicators 507 to indicate the nature of the use of the accessibility tools.

While the exemplary embodiment shown in FIG. 5 is directed to an embodiment in which all of the devices 501–508 are present in a server of the data network, the invention is not limited to such an architecture. Rather one or more of the devices 501–508 may be distributed amongst a plurality of devices in the data network. For example, a first server may have devices 501 and 503–507 while a second server may have payment service 502. Moreover, one or more of the devices 501–508 may be resident in an agent on the user's client device.

In operation, the accessibility service provider receives a request for content from a user's client device. The request includes an address of the content provider and the content requested, an identifier of the user or user's client device, and the like. This information may be provided in data packet headers, for example, of the request. Based on the user identifier, the controller 500 may identify the user's needs and abilities as well as the accessibility tool that should be used to provide the requested content to the user in a format that compensates for the user's needs and abilities. Such a determination may be made by looking-up the user in a registered user directory associated with the controller 500, for example. Alternatively, the data packet header of the request may include an indicator of the user's needs and/or abilities.

Once the controller 500 has determined the required accessibility tool to be used with the requested content, the controller 500 redirects the user's request to a mirror web site that is specially formatted for use with the identified accessibility tool. The content is retrieved from the mirror web site and input to the accessibility tool. The accessibility tool then outputs the content in a format for use by the user taking into consideration the user's needs and abilities. This process may be repeated for each request sent by the user via the user's client device. Furthermore, input from the user may be processed by the controller 500 in a reverse manner.

During this process, the intelligent agent device 501 monitors the accessibility tools used by the user and identifies the suppliers of the accessibility tools through the use of the tracking service device 503 and supplier database 504 and accessibility tools database 505. The intelligent agent further tracks the content providers who have provided content to the user using one or more of the accessibility tools. The intelligent agent device then stores the indicators 507 corresponding to this tracked information.

Once a user's session with the accessibility service provider is complete, the payment service device 502 checks the indicators 507 to determine which accessibility tools were provided to the user, who the suppliers of those accessibility tools are, and the like. The payment service device 502 may then look-up the accessibility tool and/or the supplier of the accessibility tool in the agreement database 506 to determine if an agreement has been established with the supplier of the accessibility tool regarding a royalty to be paid to the supplier. If so, the payment service device 502 makes payment to an account of the supplier in accordance with the agreement terms.

Figure 6:
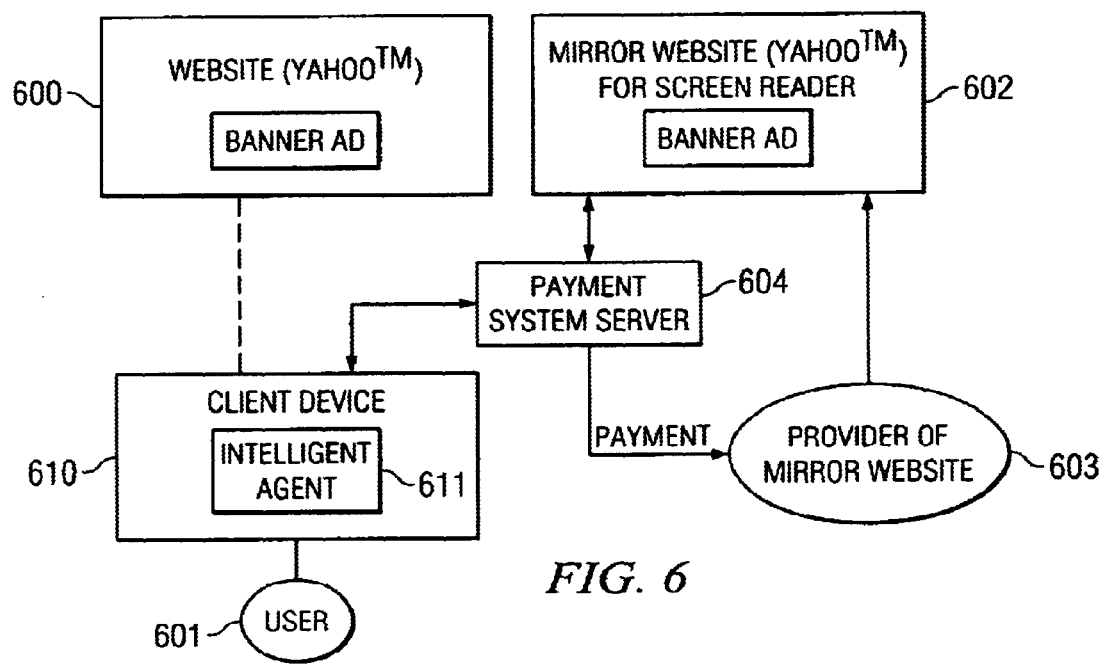
FIG. 6 is an example implementation of the present invention when used by visually impaired people.

FIG. 6 is an example of the accessibility service for visually impaired people. In this example, visually impaired user 601 is attempting to access the Yahoo website 604. This user is using a computer 610 that has an intelligent agent 611 that activates a mirror website that was created earlier. The mirror website created earlier is described in the incorporated U.S. Pat. No. 6,665,642 B2 issued on Dec. 16, 2003. The mirror web site gives the user the ability to access the same information as on the original website but is enhanced for use with the accessibility tools provided by the present invention. The user may click on the Yahoo banners through the screen reader website 602. This is connected to the payment system server 604. Through the payment system server 604 the provider of mirror website 602 receives a payment for each click that a user makes on banners on the website, or a percent from all the user's purchases on the website.

Figures 7, 8:
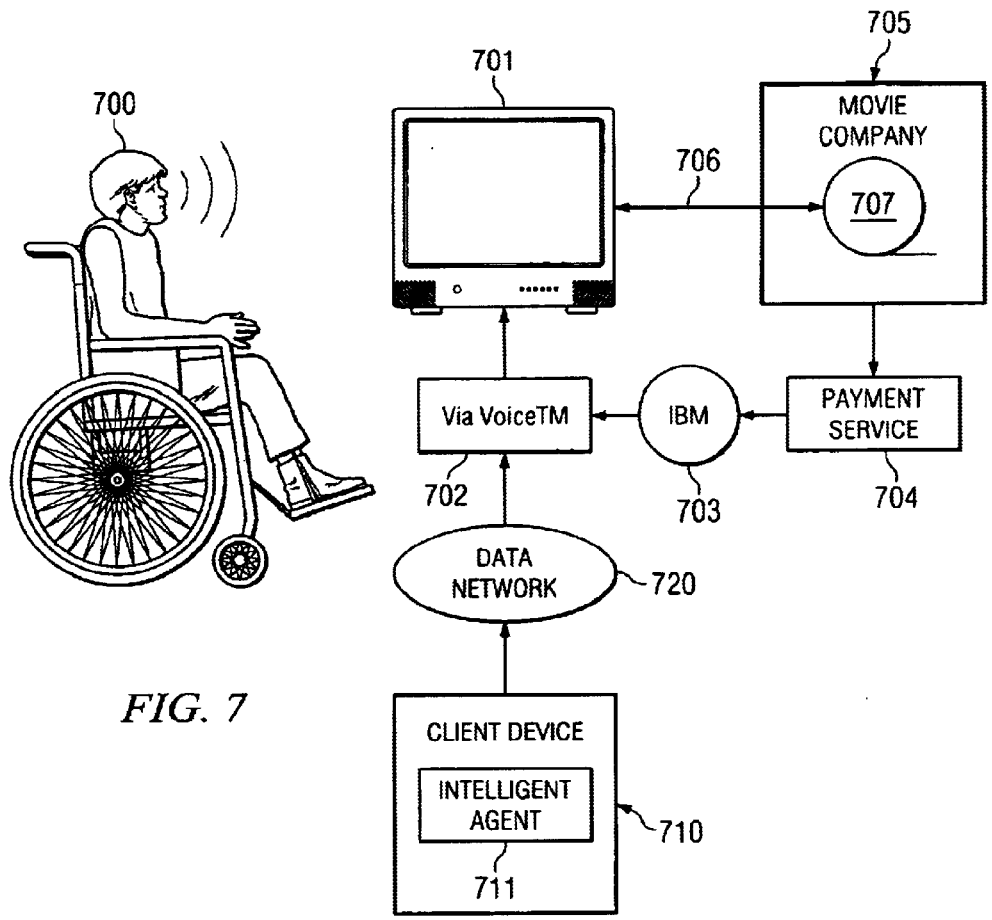
FIG. 7 is an example implementation of the present invention when used by a paralyzed person.
FIG. 8 illustrates an exemplary agreement database in accordance with the present invention.

FIG. 7 gives another example of how the present invention may be used to provide accessibility service to a disabled person. In this example, a paralyzed person 700 is watching television 701 and controlling it with his voice through the Via Voice™ program 702. Via Voice™ activates different channels on the television and allows for the watching of movies. For example, a movie 707 on channel 706 is broadcast by a movie company 705. The payment service 704 monitors that the disabled person can watch the movie that is playing and makes sure that part of the payment for the movie goes to IBM 703 for providing the Via Voice™ service to the paralyzed person 700.

The intelligent agent 711 that monitors this process may be in a personal computer 710 that may, through a network, 720 be connected to the Via Voice and to the television. The intelligent agent 711 monitors that these services are being provided correctly and communicates this to the payment service 704. The personal computer 710 may be located in the user's room or somewhere else.

FIG. 8 illustrates the agreement database. Column 801 may contain the following information: Name of supplier (for example IBM) 802, name of tools (for example Via Voice™ or Screen Reader™) 803, a situation where these tools are used (for example watching TV or Browsing the Internet) 804, time when these tools may be used 805, a category of users (for example hearing impaired, visually impaired) 806, the payment scheme (this includes contracts and agreements of other companies, what percent of payment they agree to transfer to the supplier of accessibility tools) 807, privacy issues (for example, high security for user's that do not want others to know that they are using accessibility tools 808, and the names of individual users that may have agreements in the agreement database of the accessibility service provider that may also pay additional service fees 809.

FIG. 9 is an exemplary diagram illustrating how a contractor uses the agreement between the accessibility service provider and the provider of content according to payment scheme 807 in FIG. 8. Module 900 contains the name of content that is being used. Module 901 is the general fee for access for non-handicapped users. For example, if a non-handicapped user makes a click on an advertisement on a Yahoo web page, then part of the money goes to the provider of the advertisement. Module 903 contains the name of the supplier that provided access to the content. Module 902 is the percent of the fee from 901 that goes to the supplier 903. For example, if Yahoo gets 1 cent for every click on a particular advertisement on its web page, then, if the user is handicapped, then ½ a cent goes to the provider of Screen Reader (because of Screen Reader™ a visually impaired person was able to click on the advertisement banner).

FIG. 10 is a flowchart outlining an exemplary operation of the present invention. As shown in FIG. 10, a request for content is received (step 1000). A determination is made as to whether the person requesting the content has a special need and/or different set of abilities, e.g., a disability or handicap (step 1001). This determination may be made through an intelligent agent, for example. If the person requesting access does not have a special need and/or different set of abilities, then the access proceeds as usual (step 1002). If it is determined that the person requesting access to content does have a special need and/or set of abilities, then it is determined if the person is signed up for the accessibility service (what tools does the person use and what are the person's special needs and/or set of abilities) (step 1003).

If the person is not signed up to the service then recommends that the person sign up for the accessibility service to easier serve the user in the future as well as paying a supplier of an accessibility product or tool (step 1005). If the person is signed up for the services then the system checks if the supplier of the accessibility tool being used is signed up with the accessibility Service (step 1004). If the supplier is not signed up for the accessibility service then the system finds the supplier and recommends that the supplier sign up with the service (step 1007). If the supplier of the accessibility tool or service is signed up with the accessibility service, then the system activates the payment scheme for this supplier (step 1006). In other words, a certain percent of the revenue generated because of the accessibility tool goes to the accessibility tool supplier or service provider.

Thus, the present invention provides a mechanism by which a supplier of an accessibility tool may provide the tool to disabled users on a per-use basis and receive a portion of the revenue obtained from the user of the accessibility tool. This provides the user with much needed tools to aid the user in obtaining access to content on the data network. In addition, the supplier is able to provide the accessibility tool at a relatively cheap cost to the supplier.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A method of providing access to content, comprising:
    receiving a request for content from a client device, wherein the request includes an identifier of an accessibility tool that is necessary for compensating for a disability of a user of the client device, and wherein the request is directed to a first content provider that provides first content;
    determining an accessibility tool to be used in providing the content to the user of the client device based on the identifier of the accessibility tool;
    redirecting the request for content to a second content provider that provides second content based on the determined accessibility tool, wherein the second content is the same as the first content but the second content is formatted for use with the determined accessibility tool;
    retrieving the second content from the second content provider;
    processing the second content using the accessibility tool to produce processed content; and
    outputting the processed content to the client device.

2. The method of claim 1, further comprising:
    identifying a supplier of the accessibility tool; and
    determining an amount of funds to be transferred to the supplier of the accessibility tool.

3. The method of claim 2, wherein determining an amount of funds includes calculating a percentage of an amount of funds generated by the first content provider based on the request for content.

4. The method of claim 1, wherein the accessibility tool is one of a plug-in device to a web browser application, an applet, and an accessibility tool on a server.

5. The method of claim 1, wherein the accessibility tool is one or more of automatic speech recognition, a screen reader, and an intelligent agent.

6. The method of claim 1, further comprising storing an indicator of at least one of a supplier of the requested content, the requested content, the accessibility tool, and the user.

7. The method of claim 1, further comprising determining if a supplier of the accessibility tool is to be paid for use of the accessibility tool; and
    transferring funds to the supplier of the accessibility tool if the supplier is to be paid for use of the accessibility tool.

8. The method of claim 7, further comprising calculating an amount of the funds to be transferred to the supplier based on contractual terms agreed to by the supplier.

9. The method of claim 8, wherein the contractual terms are retrieved from an agreement database.

10. The method of claim 1, wherein the identifier of the accessibility tool includes an identifier of a user, and wherein determining the accessibility tool includes looking-up the identifier of the user in a registered user directory.

11. A computer program product in a computer readable medium for providing access to content, comprising:
    first instructions for receiving a request for content from a client device, wherein the request includes an identifier of an accessibility tool that is necessary for compensating for a disability of a user of the client device, and wherein the request is directed to a first content provider that provides first content;
    second instructions for determining an accessibility tool to be used in providing the content to the user of the client device based on the identifier of the accessibility tool;
    third instructions for redirecting the request for content to a second content provider that provides second content based on the determined accessibility tool, wherein the second content is the same as the first content but the second content is formatted for use with the determined accessibility tool;
    fourth instructions for retrieving the second content from the second content provider;
    fifth instructions for processing the second content using the accessibility tool to produce processed content; and
    sixth instructions for outputting the processed content to the client device.

12. The computer program product of claim 11, further comprising:
    seventh instructions for identifying a supplier of the accessibility tool; and
    eighth instructions for determining an amount of funds to be transferred to the supplier of the accessibility tool.

13. The computer program product of claim 12, wherein the eighth instructions for determining an amount of funds include instructions for calculating a percentage of an amount of funds generated by a source of the requested content based on the request for content.

14. The computer program product of claim 11, wherein the accessibility tool is one of a plug-in device to a web browser application, an applet, and an accessibility tool on a server.

15. The computer program product of claim 11, wherein the accessibility tool is one or more of automatic speech recognition, a screen reader, and an intelligent agent.

16. The computer program product of claim 11, further comprising seventh instructions for storing an indicator of at least one of a supplier of the requested content, the requested content, the accessibility tool, and the user.

17. The computer program product of claim 11, further comprising:
    seventh instructions for determining if a supplier of the accessibility tool is to be paid for use of the accessibility tool; and eighth instructions for transferring funds to the supplier of the accessibility tool if the supplier is to be paid for use of the accessibility tool.

18. The computer program product of claim 17, further comprising ninth instructions for calculating an amount of the funds to be transferred to the supplier based on contractual terms agreed to by the supplier.

19. The computer program product wherein the contractual terms are retrieved from an agreement database.

20. The computer program product of claim 11, wherein the identifier of the accessibility tool includes an identifier of the user, and wherein the second instructions for determining the accessibility tool include instructions for looking-up the identifier of the user in a registered user directory.

21. An apparatus for providing access to content, comprising:

a controller;

a tracking device coupled to the controller; and a payment device coupled to the tracking device, wherein the controller:

receives a request for content from a client device, the request including an identifier of an accessibility tool that is necessary for compensating for a disability of a user of the client device and being directed to a first content provider that provides first content, determines one or more accessibility tools to be used in providing content to the user of the client device based on the identifier of the accessibility tool, redirects the request for content to a second content provider that provides second content based on the determined accessibility tool, wherein the second content is the same as the first content but the second content is formatted for use with the determined accessibility tool, retrieves the second content from the second content provider, processes the second content using the accessibility tool to produce processed content, and outputs the processed content to the client device, wherein the tracking device stores tracking information regarding the content provided to the user, the one or more accessibility tools used, and one or more suppliers of the one or more accessibility tools, and wherein the payment device transfers funds to the one or more suppliers based on the tracking information.

22. The apparatus of claim 21, wherein the payment device determines an amount of funds to be transferred to the one or more suppliers.

23. The apparatus of claim 22, wherein the payment device determines an amount of funds to be transferred by calculating a percentage of an amount of funds generated by the first content provider based on the request for content.

24. The apparatus of claim 21, wherein the payment device determines if a supplier of the one or more suppliers is to be paid for use of a corresponding accessibility tool.

25. The apparatus of claim 24, wherein the payment device identifies an amount of funds to transfer to the supplier by calculating an amount of the funds to be transferred to the supplier based on contractual terms agreed to by the supplier.

26. The apparatus of claim 25, wherein the contractual terms are retrieved from an agreement database.

27. The apparatus program product of claim 21, wherein the identifier of the accessibility tool includes an identifier of the client device, and wherein the processor determines the one or more accessibility tools by looking-up the identifier of the client device in a registered user directory.

28. An apparatus for providing access to content, comprising:

means for receiving a request for content from a client device, wherein the request includes an identifier of an accessibility tool that is necessary for compensating for a disability of a user of the client device, and wherein the request is directed to a first content provider that provides first content;

means for determining an accessibility tool to be used in providing the content to the user of the client device based on the identifier of the accessibility tool;

means for redirecting the request for content to a second content provider that provides second content based on the determined accessibility tool, wherein the second content is the same as the first content but the second content is formatted for use with the determined accessibility tool;

means for retrieving the second content from the second content provider;

means for processing the second content using the accessibility tool to produce processed content; and means for outputting the processed content to the client device.

* * * * *

UNITED STATES PATENT AND TRADEMARK OFFICE
CERTIFICATE OF CORRECTION

PATENT NO.    : 6,922,726 B2
DATED         : July 26, 2005
INVENTOR(S)   : Basson et al.

It is certified that error appears in the above-identified patent and that said Letters Patent is hereby corrected as shown below:

Column 13,
Line 8, after "product" insert -- of claim 18, --.

Column 14,
Line 18, after "apparatus" delete "program product".

Signed and Sealed this

Third Day of January, 2006

JON W. DUDAS
*Director of the United States Patent and Trademark Office*